United States Patent
Yun et al.

(10) Patent No.: US 12,244,019 B2
(45) Date of Patent: *Mar. 4, 2025

(54) ELECTRODE ASSEMBLY WITH INSULATION FILM FORMED ON TAB, MANUFACTURING METHOD THEREOF, AND LITHIUM SECONDARY BATTERY COMPRISING THE SAME

(71) Applicant: LG ENERGY SOLUTION, LTD., Seoul (KR)

(72) Inventors: Hyunwoong Yun, Daejeon (KR); Hoejin Hah, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 502 days.

This patent is subject to a terminal disclaimer.

(21) Appl. No.: 17/629,134

(22) PCT Filed: Jan. 29, 2021

(86) PCT No.: PCT/KR2021/001228
§ 371 (c)(1),
(2) Date: Jan. 21, 2022

(87) PCT Pub. No.: WO2021/172774
PCT Pub. Date: Sep. 2, 2021

(65) Prior Publication Data
US 2022/0231300 A1    Jul. 21, 2022

(30) Foreign Application Priority Data
Feb. 27, 2020    (KR) .................. 10-2020-0024624

(51) Int. Cl.
*H01M 4/64*    (2006.01)
*H01M 4/36*    (2006.01)
(Continued)

(52) U.S. Cl.
CPC .............. *H01M 4/64* (2013.01); *H01M 4/366* (2013.01); *H01M 4/623* (2013.01); *H01M 4/624* (2013.01);
(Continued)

(58) Field of Classification Search
None
See application file for complete search history.

(56) References Cited

U.S. PATENT DOCUMENTS

2009/0280375 A1    11/2009  Obika
2012/0082891 A1    4/2012   Ahn
(Continued)

FOREIGN PATENT DOCUMENTS

CN    104170126 A    11/2014
CN    104789754 A    7/2015
(Continued)

OTHER PUBLICATIONS

International Search Report (PCT/ISA/210) issued in PCT/KR2021/001228, dated May 13, 2021.
(Continued)

*Primary Examiner* — Amanda C. Walke
(74) *Attorney, Agent, or Firm* — Birch, Stewart, Kolasch & Birch, LLP

(57) ABSTRACT

Disclosed are an electrode assembly, a manufacturing method thereof, and a lithium secondary battery comprising the same. The electrode assembly for the lithium secondary battery includes an electrode, a separator, and an opposing electrode, wherein the electrode has a structure in which an electrode active material layer is formed on an electrode current collector including an electrode current collection substrate and a tab extending from the electrode current collection substrate, an insulation film is formed on some or all of at least one surface of the tab, and the insulation film
(Continued)

is an organic-inorganic hybrid film including inorganic particles and a binder polymer.

15 Claims, 1 Drawing Sheet

(51) Int. Cl.
  *H01M 4/62* (2006.01)
  *H01M 10/0525* (2010.01)
  *H01M 4/02* (2006.01)
(52) U.S. Cl.
  CPC .. *H01M 10/0525* (2013.01); *H01M 2004/027* (2013.01); *H01M 2004/028* (2013.01)

(56) References Cited

U.S. PATENT DOCUMENTS

| | | | |
|---|---|---|---|
| 2015/0243964 A1 | 8/2015 | Yu et al. | |
| 2017/0309951 A1 | 10/2017 | Ishikawa et al. | |
| 2018/0254468 A1 | 9/2018 | Kim et al. | |
| 2019/0157650 A1 | 5/2019 | Oura et al. | |
| 2019/0393474 A1 | 12/2019 | Lee et al. | |
| 2020/0035973 A1* | 1/2020 | Mankyuu | H01M 50/451 |
| 2020/0168940 A1 | 5/2020 | Hong et al. | |
| 2020/0212495 A1 | 7/2020 | Lee et al. | |
| 2021/0013512 A1* | 1/2021 | Yun | H01M 4/366 |
| 2021/0075064 A1* | 3/2021 | Yun | H01M 50/491 |

FOREIGN PATENT DOCUMENTS

| | | |
|---|---|---|
| CN | 107949933 A | 4/2018 |
| CN | 108987669 A | 12/2018 |
| EP | 3 407 417 A1 | 11/2018 |
| EP | 3 748 760 A1 | 12/2020 |
| JP | 2016-189300 A | 11/2016 |
| JP | 6662793 B2 | 3/2020 |
| KR | 100868256 B1 * | 11/2008 |
| KR | 10-0985261 B1 | 10/2010 |
| KR | 10-2012-0034567 A | 4/2012 |
| KR | 10-2015-0046552 A | 4/2015 |
| KR | 10-2015-0076897 A | 7/2015 |
| KR | 10-1790230 B1 | 11/2017 |
| KR | 10-1827431 B1 | 2/2018 |
| KR | 10-2018-0097085 A | 8/2018 |
| KR | 10-2019-0024707 A | 3/2019 |
| KR | 10-2018849 B1 | 9/2019 |
| WO | WO 2018/020896 A1 | 2/2018 |
| WO | WO 2019/045552 A1 | 3/2019 |
| WO | WO 2020/159083 A1 | 8/2020 |
| WO | WO 2020/159296 A1 | 8/2020 |

OTHER PUBLICATIONS

Extended European Search Report European Application No. 21760993.2, dated Feb. 6, 2024.

* cited by examiner

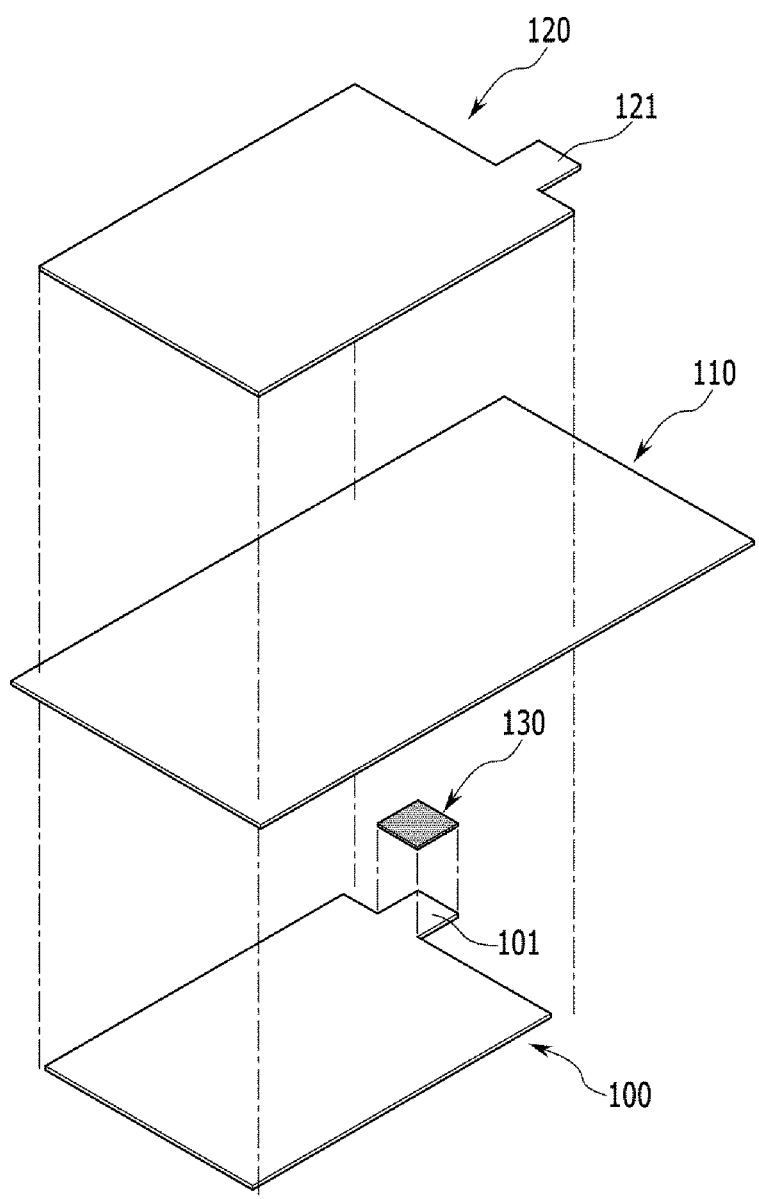

ELECTRODE ASSEMBLY WITH INSULATION FILM FORMED ON TAB, MANUFACTURING METHOD THEREOF, AND LITHIUM SECONDARY BATTERY COMPRISING THE SAME

MUTUAL CITATION WITH RELATED APPLICATION(S)

This application claims priority to and the benefit of Korean Patent Application No. 10-2020-0024624 filed in the Korean Intellectual Property Office on Feb. 27, 2020, the entire contents of which are incorporated herein by reference.

TECHNICAL FIELD

The present invention relates to an electrode assembly with an insulation film formed on a tab, a manufacturing method thereof, and a lithium secondary battery comprising the same.

BACKGROUND ART

Due to the rapid increase in the use of fossil fuels, the demand for the use of alternative energy or clean energy is increasing, and as part of this, a field that have been studied most actively are a field of power generation and condensation using electrochemicals.

Currently, a representative example of an electrochemical device using such electrochemical energy may be a secondary battery, and its use field is gradually expanding.

Recently, as the technology development and demand for portable devices such as portable computers, portable phones, cameras increases, the demand for secondary batteries is rapidly increasing as an energy source. Among such secondary batteries, a lot of research has been conducted on eco-friendly lithium secondary batteries representing high charging and discharging characteristics and lifetime characteristics, and the lithium secondary batteries have been commercially and widely used.

An electrode assembly embedded in a battery case is a power generation device that consists of a laminated structure of positive electrode/separator/negative electrode and is chargeable and dischargeable. The electrode assembly is classified into a jelly-roll type wound with a long sheet type of separator coated with an active material between a positive electrode and a negative electrode, and a stack type in which a plurality of positive electrodes and negative electrodes with small sizes are sequentially stacked with a separator therebetween. As combinations thereof, the electrode assembly is classified into a stack/folding type in which a bi-cell or full-cell including a positive electrode, a negative electrode, and a separator are wound with a long sheet-like separation film with a long full-cell, and a lamination/stack type of laminating and then stacking the bi-cells or full-cells.

Meanwhile, in general, the lithium secondary battery has a structure in which a non-aqueous electrolyte is swelled in an electrode assembly consisting of a positive electrode, a negative electrode and a porous separator. The positive electrode is prepared by coating a positive electrode mixture containing a positive electrode active material on aluminum foil, the negative electrode is prepared by coating a negative electrode mixture containing a negative electrode active material on copper foil.

Generally, the positive electrode active material is a lithium shift metal oxide, and the negative electrode active material uses a carbon-based material. However, recently, as the negative electrode active material, a lithium metal battery using lithium metal itself has been commercialized, and furthermore, studies on a lithium free battery have been actively conducted, in which during manufacturing, only a current collector is used as a negative electrode, lithium is received from a positive electrode by discharging, and lithium metal is used as a negative electrode active material.

Meanwhile, in such a lithium secondary battery, the positive electrode and the negative electrode are formed with different areas due to a capacity difference, etc. For this, an edge portion of a side that is formed larger and a tab of a side that is formed smaller are very frequently in contact with each other to be short-circuited. In some cases, when the active material is coated to the tab, even if a large current flows in a short time by short circuit or the like, there is a risk of fire/explosion as the battery is heated by heat generation.

In order to solve this phenomenon, a technique for attaching a polymeric insulating tape to the electrode tab, or for coating an insulating layer has been applied to mass production.

However, in this case, when the insulating tape or the insulating layer is formed on an electrode active material layer, the resistance increases so that a defect rate is increased. Particularly, when the insulating layer is coated on the electrode active material layer during coating, while the pores of the electrode active material layer are filled, the resistance is rapidly increased, the cell capacity is reduce, and as a result, there is a problem that the cells are frequently classified as defective cells.

Accordingly, since the resistance increase and capacity reduction are efficiently prevented by solving the above problems, there is a high need on a structure capable of ensuring battery safety while reducing the defect rate according to the battery production.

DISCLOSURE

Technical Problem

Therefore, an object of the present invention is to solve the problems in the related art as described above and the technical problems that have been requested from the past.

Specifically, the present invention has been made in an effort to provide an electrode assembly, a manufacturing method thereof, and a lithium secondary battery comprising the same by forming an organic-inorganic hybrid composition including inorganic particles and a binder polymer on a tab of an electrode in the form of an insulation film so as to prevent an increase in defect rate due to increased resistance and reduced capacity while effectively preventing a short circuit which may occur between a positive electrode and a negative electrode.

Technical Solution

Therefore, an exemplary embodiment of the present invention provides an electrode assembly for a lithium secondary battery including: an electrode, a separator, and an opposing electrode, wherein the electrode has a structure in which an electrode active material layer is formed on an electrode current collector including an electrode current collection substrate and a tab extending from the electrode current collection substrate, an insulation film is formed on some or all of at least one surface of the tab, and the insulation film is an organic-inorganic hybrid film including inorganic particles and a binder polymer.

Specifically, the insulation film may be formed on the tab of the electrode in a direction in which the electrode and the opposing electrode face each other.

Furthermore, the insulation film may be further formed on the tab of the opposing electrode in a direction in which the electrode and the opposing electrode face each other.

More specifically, the insulation films are formed on the whole of both sides of the tab to prevent short circuits regardless of any direction or any position.

Meanwhile, the binder polymer configuring the organic-inorganic hybrid film may be at least one selected from the group consisting of polyvinylidene fluoride-co-hexafluoro-propylene, polyvinylidene fluoride-co-trichloroethylene, polymethylmethacrylate, polyacrylonitrile, polyvinylpyrrolidone, polyvinylacetate, polyethylene-co-vinyl acetate, polyimide, polyethylene oxide, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, and polyvinylalcohol.

The inorganic particle may be at least one selected from the group consisting of (a) an inorganic particle having a dielectric constant of 1 or more, (b) an inorganic particle having piezoelectricity, (c) thermal conductive inorganic particles, and (d) an inorganic particle having a lithium-ion transfer capability.

At this time, the content of the inorganic particles may be 1 to 99 wt % per 100 wt % of the mixture of the inorganic particles and the binder polymer.

The insulation film may be formed in a thickness of 0.1 μm to 100 μm.

In one example, the electrode may be a positive electrode and the opposing electrode may be a negative electrode, and in another example, the electrode may be a negative electrode and the opposing electrode may be a positive electrode.

The separator may be an SRS separator.

Another exemplary embodiment of the present invention provides a manufacturing method of an electrode assembly including the steps of:

(a) preparing an electrode having a structure in which an electrode active material layer is formed on an electrode current collector including an electrode current collection substrate and a tab extending from the electrode current collection substrate, and an opposing electrode;

(b) preparing a laminate by coating and drying an organic-inorganic hybrid composition including inorganic particles and a binder polymer on a release film, thereby laminating an organic-inorganic hybrid film on the release film;

(c) forming an insulation film on some or all of at least one surface of the tab of the electrode by laminating the organic-inorganic hybrid film after removing the release film from the laminate or directly transferring the organic-inorganic hybrid film from the laminate; and (d) manufacturing the electrode assembly with a separator interposed between the electrode of which the insulation film is formed on at least one surface of the tab and the opposing electrode.

At this time, as described above, the insulation film may be formed on the tab of the electrode in a direction in which the electrode and the opposing electrode face each other, and may be further formed on the tab of the opposing electrode in a direction in which the electrode and the opposing electrode face each other.

Yet another exemplary embodiment of the present invention provides a lithium secondary battery including the electrode assembly and an electrolyte.

DESCRIPTION OF THE DRAWING

The FIGURE is an exploded perspective view of an electrode, a separator, and an opposing electrode according to an exemplary embodiment of the present invention.

MODE FOR INVENTION

Therefore, according to an exemplary embodiment of the present invention, there is provided an electrode assembly for a lithium secondary battery comprising:

an electrode, a separator, and an opposing electrode,
wherein the electrode has a structure in which an electrode active material layer is formed on an electrode current collector including an electrode current collection substrate and a tab extending from the electrode current collection substrate,
an insulation film is formed on some or all of at least one surface of the tab, and the insulation film is an organic-inorganic hybrid film including inorganic particles and a binder polymer.

At this time, the insulation film, specifically, may be formed on the tab of the electrode in a direction in which the electrode and the opposing electrode face each other.

Furthermore, the insulation film may be further formed on the tab of the opposing electrode in a direction in which the electrode and the opposing electrode face each other.

Accordingly, as an example, when the opposing electrodes are laminated on both sides of the electrode, the insulation films may be formed on both sides of the tab of the electrode, or may be included in directions of facing the electrode and the opposing electrode, respectively.

As another example, when the electrode and the opposing electrode are included one by one, the insulation film of the electrode is formed on one side or both sides facing the opposing electrode, and the opposing electrode may include or not the insulation film.

However, when two or more electrodes and two or more opposing electrodes are included, more various structures are enabled.

For example, when all of the two or more electrodes include the insulation film only on one side of the tab, an insulation film may be included on one or both sides of the tab of one or more opposing electrodes so that the insulation film may be formed on the tab between the opposing electrode and the electrode on the other side of the electrode.

On the other hand, if the two or more electrodes include the insulation film on both sides of the tab, the opposing electrode may include or not an insulation film on the tab.

In addition, when some of the two or more electrodes include the insulation film only on one side of the tab and some thereof include the insulation film on both sides of the tab, at a position where there is no insulation film between the electrode and the opposing electrode, various structures are enabled, such as that the insulation film may be included on one or both sides of the tab of the opposing electrode.

That is, at a position where a short circuit may occur between the electrode and the opposing electrode, any structure in which the insulation film may be formed on one or both sides of the tab of the electrode and/or the opposing electrode is included in the scope of the present invention.

More specifically, the insulation films are formed on the whole of both sides of the tab to effectively prevent short circuits regardless of any direction or any position while simplifying a manufacturing process.

Meanwhile, since the insulation film according to the present invention may be formed in the whole of the tab and may affect the electrode active material layer during the formation of the insulation film, the insulation film should not interfere with the movement of lithium ions according to the charging and discharging of the electrode to prevent the deterioration in secondary battery performance.

Accordingly, the insulation film may be an organic-inorganic hybrid film including inorganic particles and a binder polymer in order to ensure the mobility of lithium ions. Such an organic-inorganic hybrid film has better mobility of lithium ions than the separator, and even if the organic-inorganic hybrid film affects the electrode active material layer, the organic-inorganic hybrid film may prevent a decrease in the capacity and output performance of the battery.

The binder polymer is not limited as long as the binder polymer does not cause a side reaction with the electrolyte, but particularly, a glass transition temperature (Tg) may be used as low as possible, preferably in the range of −200° C. to 200° C. This is because the mechanical properties of the final insulation film may be improved.

Further, the binder polymer does not necessarily have an ion conductive ability, but it is more preferable to use a polymer having an ion conductive ability. When the insulation film covers a part of the electrode, it is preferable in terms of capacity because lithium ions of the active material are movable even in the part thereof.

Accordingly, it is preferred that the binder polymer has a dielectric constant as high as possible, and actually, since the dissociation rate of the salt in the electrolyte depends on the dielectric constant of an electrolyte solvent, the dielectric constant of the polymer is increased, the more the salt dissociation rate in the electrolyte may be improved. The dielectric constant of the polymer is 1 or higher, specifically usable in the range of 1.0 to 100 (measurement frequency=1 kHz), and particularly, preferably 10 or higher.

In addition to the aforementioned functions, the binder polymer is gelled during swelling in a liquid electrolyte to have a characteristic capable of exhibiting a high degree of electrolyte swelling. Actually, when the binder polymer is a polymer having an excellent degree of electrolyte swelling, an electrolyte injected after the battery is assembled permeates into the polymer and the polymer containing the absorbed electrolyte has electrolyte ion conductivity. Accordingly, if possible, in the polymer, a solubility index is preferably 15 to 45 MPa$^{1/2}$, more preferably, in the range of 15 to 25 MPa$^{1/2}$ and 30 to 45 MPa$^{1/2}$. When the solubility index is less than 15 MPa$^{1/2}$ and more than 45 MPa$^{1/2}$, it is difficult to be swelled by a general liquid electrolyte for a battery.

Examples of the binder polymer may include polyvinylidene fluoride-co-hexafluoropropylene, polyvinylidene fluoride-co-trichloroethylene, polymethylmethacrylate, polyacrylonitrile, polyvinylpyrrolidone, polyvinylacetate, polyethylene-co-vinyl acetate, polyimide, polyethylene oxide, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, and polyvinylalcohol, or mixtures thereof, but are not limited thereto. Any material including the above-described properties may be used alone or in combination.

Meanwhile, as another component configuring the insulation film, the inorganic particles serve to form micropores by forming an empty space between the inorganic particles and serve as a kind of spacer capable of maintaining a physical form. Further, since the inorganic particles generally have a characteristic that the physical properties do not change even in a high temperature of 200° C. or higher, the formed organic-inorganic hybrid layer has excellent heat resistance.

The inorganic particles are not particularly limited as long as they are electrochemically stable. That is, the inorganic particles that may be used in the present invention are not particularly limited as long as the oxidation and/or reduction reaction does not occur in an operating voltage range (e.g., 0 to 5 V based on Li/Li$^+$) of the battery to be applied. Particularly, when inorganic particles with ion transfer ability are used, since the performance may be improved by increasing the ion conductivity in an electrochemical device, it is preferable to increase the ion conductivity as high as possible. Further, when the inorganic particles have a high density, it is difficult to be dispersed during manufacturing and there is a problem in increased weight when the battery is manufactured, and as a result, it is preferable to have a density as small as possible. Further, an inorganic material with a high dielectric constant contributes to an increase in dissociation rate of an electrolyte salt, for example, a lithium salt in the liquid electrolyte to improve the ion conductivity of the electrolyte. Finally, more preferably, inorganic particles with thermal conductivity have excellent endothermy to prevent a phenomenon in which heat is locally concentrated to form a heating point, resulting in thermal explosion.

Due to the aforementioned reasons, the inorganic particles are preferably at least one selected from the group consisting of (a) high-dielectric inorganic particles with a dielectric constant of 1 or higher, 5 or higher, preferably 10 or higher, (b) inorganic particles with piezoelectricity, (c) thermal conductive inorganic particles, and (d) inorganic particles with a lithium ion transfer ability.

The inorganic particles with piezoelectricity refer to a material which is a nonconductor at atmospheric pressure, but has a conductive property by an internal structural change when a predetermined pressure is applied. The inorganic particles with piezoelectricity refer to a material which exhibits a high dielectric property with a dielectric constant of 100 or higher and has a function of generating a potential difference between both sides when one side is charged to positive and the other side is charged to negative by charges generated while tensioned or compressed by applying a predetermined pressure.

In the case of using the inorganic particles having the above characteristics as a component of the insulation film, the inorganic particles not only prevent direct contact between the two electrodes from external impacts or dendrite growth, but also a potential difference in particles is generated even by external impacts due to pieozoelectricity of the inorganic particles to perform electron movement, that is, the flow of a fine current between the both electrodes, thereby gently reducing the voltage of the battery and promoting the improvement of safety.

Examples of the inorganic particles with piezoelectricity include $BaTiO_3$, $Pb(Zr,Ti)O_3$ (PZT), $Pb_{1-x}La_xZr_{1-y}Ti_yO_3$ (PLZT), $PB(Mg_3Nb_{2/3})O_3$—$PbTiO_3$ (PMN-PT), hafnia ($HfO_2$) or mixtures thereof, but are not limited thereto.

The inorganic particles with the lithium ion transfer ability refer to inorganic particles which contain lithium elements, but have a function of moving lithium ions without storing lithium. Since the inorganic particles with the lithium ion transfer ability may transfer and move the lithium ions due to a kind of defect present in the particle structure, it is possible to prevent a decrease in lithium mobility due to the formation of the insulation film and to prevent reduction of the battery capacity.

Examples of the inorganic particles with the lithium ion transfer ability include $(LiAlTiP)_xO_y$-based glass ($0<x<4$, $0<y<13$), such as lithiumphosphate ($Li_3PO_4$), lithiumtitaniumphosphate ($Li_xTi_y PO_{43}$, $0<x<2$, $0<y<3$), lithiumaluminumtitaniumphosphate ($Li_xAl_yTi_z PO_{43}$, $0<x<2$, $0<y<1$, $0<z<3$), and $14Li_2O$-$9Al_2O_3$-$38TiO_2$-$39P_2O_5$, $SiS_2$-based glass ($Li_xSi_yS_z$, $0<x<3$, $0<y<2$, $0<z<4$), such as lithiumlanthanumtitanate ($Li_xLa_yTiO_3$, $0<x<2$, $0<y<3$), lithiumgermaniumthiophosphate ($Li_xGe_yP_zS_w$, $0<x<4$, $0<y<1$, $0<z<1$, $0<w<5$) such as $Li_{3.25}Ge_{0.25}P_{0.75}S_4$, and lithiumnitride ($Li_xN_y$, $0<x<4$, $0<y<2$) such as $Li_3N$, and $P_2S_5$-based glass ($Li_xP_yS_z$, $0<x<3$, $0<y<3$, $0<z<7$) such as $LiI$—$Li_2S$—$P_2S_5$, or mixtures thereof, but are not limited thereto.

Further, examples of the inorganic particles with a dielectric constant of 1 or higher include $SrTiO_3$, $SnO_2$, $CeO_2$, $MgO$, $NiO$, $CaO$, $ZnO$, $ZrO_2$, $Y_2O_3$, $Al_2O_3$, $TiO_2$, $SiC$ or mixtures thereof, but are not limited thereto.

The thermal conductive inorganic particles are a material having insulation properties that provide low thermal resistance but do not provide electric conductivity. For example, the thermal conductive inorganic particles may be at least one selected from the group consisting of aluminum nitride (AlN), boron nitride (BN), alumina ($Al_2O_3$), silicon carbide (SiC), and beryllium oxide (BeO), but are not limited thereto.

When the high-dielectric inorganic particles, the inorganic particles with piezoelectricity, the thermal conductive inorganic particles, and the inorganic particles with the lithium ion transfer ability are combined, a synergic effect thereof may be doubled.

The size of the inorganic particles is not limited, but is preferably in the range of 0.001 to 10 μm to form an insulation film with a uniform thickness and to ensure proper porosity between the inorganic particles. If the size is less than 0.001 μm, the dispersibility is lowered to make it difficult to adjust the physical properties when manufacturing the organic-inorganic hybrid film, and when the size is more than 10 μm, the thickness is increased, the mechanical properties are reduced, and due to an excessively large pore size, the role of the insulation film is not sufficiently performed and a probability that an internal short circuit occurs is increased when the battery is charging and discharged.

The content of the inorganic particles is not particularly limited, but is preferably in the range of 1 to 99 wt %, particularly more preferably 10 to 95 wt % per 100 wt % of the mixture of the inorganic particles and the binder polymer. When the content is less than 1 wt %, since the content of the polymer is too high, the pore size and porosity are reduced due to the reduction of the empty space formed between the inorganic particles, and the mobility of lithium ions may be lowered. On the contrary, when the content is more than 99 wt %, since the polymer content is too low, due to the reduction in adhesion between the inorganic particles, the mechanical properties of the final insulation film are lowered.

As such, when the insulation film of the present invention is formed of the organic-inorganic hybrid film in which the binder polymer and the inorganic particles are mixed, the insulation film has a uniform pore structure formed by an interstitial volume between the inorganic particles. Since the smooth movement of lithium ions is made through these pores and a large amount of electrolyte is filled to exhibit a high degree of swelling, it is possible to prevent the deterioration of the battery performance according to the formation of the insulation film.

At this time, the pore size and the porosity may be adjusted together by adjusting the size and the content of the inorganic particles.

Further, in the organic-inorganic hybrid film consisting of the inorganic particles and the binder polymer, due to the heat resistance of the inorganic particles, high temperature heat shrinkage does not occur. Accordingly, since the insulation film is maintained even in excessive conditions due to internal or external factors such as high temperature, overcharging, external impact, etc., it is effective in preventing short circuits, and it is also possible to delay the thermal explosion to an endothermic effect of the inorganic particles.

The formation thickness of such an insulation film may be, for example, 0.1 μm to 100 μm, specifically, 1 μm or more, 2 μm or more, or 3 μm or more, and may be 50 μm or less, 30 μm or less, or 20 μm or less.

Out of the above range, if the thickness of the insulation film is too thin, a short-circuit prevention effect may not be obtained, and if the thickness is too thick, the mobility of lithium ions is reduced, and it is not preferable because the insulation film may affect the welding with electrode terminals.

On the other hand, after the applicants of the present invention repeated an in-depth research, when an insulator formed on the tab according to the present invention is in the form of an insulation film, the best safety is exhibited, and deterioration in secondary battery characteristics such as increased resistance, reduced capacity, and reduced ion conductivity is not caused. On the contrary, when the organic-inorganic hybrid composition is directly coated on the tab, such an organic-inorganic hybrid composition may be coated on the electrode active material layer. At this time, it was found that it is not preferable that while the pores of the electrode active material layer are filled, the resistance is increased and the capacity is reduced, and as a result, the performance of the secondary battery is deteriorated.

Accordingly, in order to exclude the form to be coated herein, it was referred to as the insulation film rather than an insulating layer.

The insulation film is an insulation film prepared separately, and may be laminated or transferred and formed onto the electrode. Accordingly, in the present invention, the "formation" of the insulation film is a concept including "laminating", and "transferring".

An example according to the structure of the present invention to be more clearly seen has been illustrated in the FIGURE.

The FIGURE illustrates an exploded perspective view of the electrode assembly in which the insulation film is formed on one side of the electrode tab according to an exemplary embodiment of the present invention.

Referring to the FIGURE, the electrode assembly includes an electrode 100, an opposing electrode 120, and a separator 110, and the electrode 100 and the opposing electrode 120 include tabs 101 and 121, respectively.

Here, the insulation film 130 is formed on the entire one side of the tab 101 in a direction in which the electrode 100 faces the opposing electrode 120.

Meanwhile, in the present invention, the electrode may be a positive electrode or a negative electrode.

For example, when the electrode is the positive electrode, the opposing electrode may be the negative electrode, and when the electrode is the negative electrode, the opposing electrode may be the positive electrode.

When the electrode is a positive electrode or a negative electrode, the electrode may be formed in a structure in which electrode slurry including an electrode active material, a conductive material, and a binder is coated, dried, and rolled on at least one side of an electrode current collector to form an electrode active material layer. Similarly, the opposing electrode may be formed in a structure in which electrode slurry including an electrode active material, a conductive material, and a binder is coated, dried, and rolled on at least one side of an electrode current collector to form an electrode active material layer.

Alternatively, when the electrode according to the present invention is the positive electrode, the electrode may be formed in a structure in which electrode slurry including an electrode active material, a conductive material, and a binder is coated, dried, and rolled on at least one side of an electrode current collector to form an electrode active material layer. The opposing electrode, the negative electrode may be formed in a structure in which lithium metal is deposited and coated on the electrode current collector or may also be formed of only the electrode current collector.

Alternatively, when the electrode according to the present invention is the negative electrode, the electrode may be formed in a structure in which a lithium metal is deposited and coated on the electrode current collector or may also be formed of only the electrode current collector. The opposing electrode, the positive electrode may be formed in a structure in which electrode slurry including an electrode active material, a conductive material, and a binder is coated, dried, and rolled on at least one side of an electrode current collector to form an electrode active material layer.

That is, from the electrode assembly according to the present invention, a lithium-ion battery, a lithium polymer battery, etc. may be manufactured, and a lithium metal battery using lithium metal as a negative electrode active material, a lithium-free battery consisting of only a negative electrode active material, etc. may also be manufactured.

Meanwhile, the electrode active material included in the positive electrode refers to a positive electrode active material and the electrode current collector refers to a positive electrode current collector.

The positive electrode current collector is not particularly limited as long as it is generally prepared in a thickness of 3 to 500 μm and has high conductivity without causing a chemical change in the corresponding battery. For example, the positive electrode current collector may use one selected from materials in which the surface of stainless steel, aluminum, nickel, titanium, and aluminum or stainless steel is treated with carbon, nickel, titanium or silver, specifically may use aluminum. The current collector may increase the adhesion of the positive electrode active material by forming fine irregularities on its surface, and may have various forms such as a film, a sheet, foil, a net, a porous body, a foam body, nonwoven fabric, etc.

The positive electrode active material may consist of, for example, a layered compound of lithium nickel oxide ($LiNiO_2$), etc., or a compound substituted with one or more transition metals; lithium manganese oxide such as Chemical Formula $Li_{1+x}Mn_{2-x}O_4$ (wherein, x is 0 to 0.33), $LiMnO_3$, $LiMn_2O_3$, and $LiMnO_2$; lithium copper oxide ($Li_2CuO_2$); vanadium oxide such as $LiV_3O_8$, $LiV_3O_4$, $V_2O_5$, and $Cu_2V_2O_7$; Ni site-type lithium nickel oxide represented by Chemical Formula $LiNi_{1-x}M_xO_2$ (wherein, M=Co, Mn, Al, Cu, Fe, Mg, B or Ga, x=0.01 to 0.3); lithium manganese composite oxide represented by Chemical Formula $LiMn_{2-x}M_xO_2$ (wherein, M=Co, Ni, Fe, Cr, Zn or Ta, x=0.01 to 0.1) or $Li_2Mn_3MO_8$ (wherein, M=Fe, Co, Ni, Cu or Zn; $LiMn_2O_4$ in which some of Li of Chemical Formula is substituted with alkaline-earth metal ions; a disulfide compound; $Fe_2(MoO_4)_3$, etc., but is not limited thereto.

Similarly, the electrode active material included in the negative electrode is referred to as a negative electrode active material, and the electrode current collector is referred to as a negative electrode current collector.

The negative electrode current collector is generally prepared in a thickness of 3 to 50 μm. Such a negative electrode current collector is not particularly limited if it has conductivity without causing a chemical change in the corresponding battery. For example, the negative electrode current collector may use materials in which the surface of copper, stainless steel, aluminum, nickel, titanium, plastic carbon, copper or stainless steel is treated with carbon, nickel, titanium or silver, specifically may use aluminum-cadmium alloys, etc. Further, like the positive current collector, fine irregularities on its surface are formed to increase the adhesion of the negative electrode active material, and the negative electrode current collector may have various forms such as a film, a sheet, foil, a net, a porous body, a foam body, nonwoven fabric, etc.

Meanwhile, in the lithium metal battery, the negative electrode current collector may be prepared so that the lithium metal itself may serve as the current collector and the active material, and the current collector may use lithium metal.

The negative active material may use, for example, carbon, such as graphite carbon, graphite-based carbon, and the like; metal composite oxide such as $Li_xFe_2O_3$ ($0 \le x \le 1$), $Li_xWO_2$ ($0 \le x \le 1$), $Sn_xMe_{1-x}Me'_yO_z$ (Me: Mn, Fe, Pb, Ge; Me': Al, B, P, Si, elements of Groups 1, 2, and 3 in the periodic table, halogen; $0 < x \le 1$; $1 \le y \le 3$; $1 \le z \le 8$); lithium metal; lithium alloys; silicon-based alloys; tin-based alloys; metal oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymer such as polyacetylene; Li—Co—Ni-based material, etc.

The conductive material is typically added with 0.1 to 30 wt %, specifically 1 to 10 wt %, and more specifically 1 to 5 wt % based on the entire weight of the mixture including the positive electrode active material. Such a conductive material is not particularly limited as long as it has conductivity without causing a chemical change in the corresponding battery. The conductive material may use, for example, graphite such as natural graphite or artificial graphite; carbon blacks such as carbon black, acetylene black, Ketjen black, channel black, funnel black, lamp black, and summer black; conductive fibers such as carbon fiber or metal fiber; fluorinated carbon; metal powders such aluminum, and nickel powder; conductive whiskers such as zinc oxide, and potassium titanate; conductive metal oxides such as titanium oxide; conductive materials such as polyphenylene derivatives, carbon nanotubes (CNT), etc.

The binder is a component that supports the bond of the active material and the conductive material and the bond to the current collector, and typically, added with 0.1 to 30 wt %, specifically 1 to 10 wt %, more specifically 1 to 5 wt % based on the total weight of the mixture containing the positive electrode active material. Examples of the binder may include polyvinylidenefluoride, polyvinylidenefluoride-hexafluoropropylene, polyvinyl alcohol, carboxymethyl cellulose (CMC), starch, hydroxypropyl cellulose, regenerated cellulose, polyvinyl pylolidone, polytetrafluoroethylene, polytetrafluoroethylene, polyethylene, polypropylene, ethylene-propylene-diene terpolymer (EPDM), sulfonated EPDM, styrene-butadiene rubber, fluorine rubber, various airborne polymers, etc.

Meanwhile, the separator is interposed between the positive electrode and the negative electrode, and may use an insulating thin film having high ion permeability and mechanical strength. A pore diameter of the separator is generally 0.01 to 10 μm and the thickness thereof is generally 1 to 300 μm. As such a separator, for example, a sheet, non-woven fabric, or the like made of olefin-based polymers such as chemical-resistant and hydrophedic polypropylene; glass fiber, polyethylene, or the like. As the electrolyte, when a solid electrolyte such as polymer is used, the solid electrolyte may also serve as the separator.

Specifically, the separator may be a safety reinforced separator (SRS). The SRS separator has a structure in which an organic/inorganic composite porous coating layer is coated on a polyolefin-based separator substrate.

The inorganic particles and the binder polymer configuring the organic/inorganic composite porous coating layer of the SRS separator are similar to those described above, and the contents disclosed in Application No. 10-2009-0018123 of the present applicant are combined by reference.

Meanwhile, according to another exemplary embodiment of the present invention, there is provided a manufacturing method of an electrode assembly including the steps of:

(a) preparing an electrode having a structure in which an electrode active material layer is formed on an electrode current collector including an electrode current collection substrate and a tab extending from the electrode current collection substrate, and an opposing electrode;

(b) preparing a laminate by coating and drying an organic-inorganic hybrid composition including inorganic particles and a binder polymer on a release film, thereby laminating an organic-inorganic hybrid film on the release film;

(c) forming an insulation film on some or all of at least one surface of the tab of the electrode by laminating the organic-inorganic hybrid film after removing the release film from the laminate or directly transferring the organic-inorganic hybrid film from the laminate; and (d) manufacturing the electrode assembly with a separator interposed between the electrode of which the insulation film is formed on at least one surface of the tab and the opposing electrode.

The electrode and the opposing electrode in step (a) may be prepared in the same structure as described above.

The forming of the laminate in step (b) is performed by coating and drying the organic-inorganic hybrid composition on the release film. At this time, the coating thickness of the organic-inorganic hybrid composition may be formed to correspond to the thickness of the insulation film described above, and the drying may be performed for 5 to 10 minutes at 60° C. to 120° C. to evaporate a solvent used when the organic-inorganic hybrid composition is prepared.

The preparing of the organic-inorganic hybrid composition is similar to the preparing of the organic/inorganic composite porous coating layer of the SRS separator, and refers to these contents.

The laminating in step (c) means a method of first the organic-inorganic hybrid film from the release film and then laminating the removed organic-inorganic hybrid film separately on the electrode. At this time, the laminating can be performed by methods such as compression, adhesion.

The transferring in step (c) means a process of directly transferring only the organic-inorganic hybrid film to at least one side of the tab from the release film formed with the organic-inorganic hybrid film. Such a transferring method can be performed by transfer by rolling, and transfer by heat, and for example, the transferring may be performed by laminating the organic-inorganic hybrid film of the laminate to face the tab of the electrode and then transferring the organic-inorganic hybrid film to the tab of the electrode from the laminate by rolling or heat.

Meanwhile, as described above, such an insulation film may be formed on the tab of the electrode in a direction in which the electrode and the opposing electrode face each other, and may be further formed even on the tab of the opposing electrode in the direction in which the electrode and the opposing electrode face each other.

Step (d) is the same as that of a general manufacturing method of an electrode assembly known in the art.

Meanwhile, according to yet another exemplary embodiment, there is provided a lithium secondary battery including the electrode assembly and an electrolyte.

The electrolyte generally uses a lithium salt-containing non-aqueous electrolyte and consists of a non-aqueous electrolyte and a lithium salt. The non-aqueous electrolyte uses a non-aqueous organic solvent, an organic solid electrolyte, an inorganic solid electrolyte, etc., but is not limited thereto. The non-aqueous organic solvent may use aprotic organic solvents, such as N-methyl-2-pyrrolidinone, propylene carbonate, ethylene carbonate, butylene carbonate, dimethyl carbonate, diethyl carbonate, gamma-butyro lactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, triester phosphate, trimethoxy methane, dioxolane derivative, sulfolane, methyl sulfolane, 1,3-dimethyl-2-imidazolidinone, propylene carbonate derivative, tetrahydrofuran derivative, ether, methyl propionate, ethyl propionate, etc.

The organic solid electrolyte may use, for example, polyethylene derivative, polyethylene oxide derivative, polypropylene oxide derivative, phosphoric acid ester polymer, polyalginate lysine, polyester sulfide, polyvinyl alcohol, polyvinylidenefluoride, polymer containing an ionic dissociation group, etc.

The inorganic solid electrolyte may use, for example, nitrides, halides, and sulfates of Li, such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, $Li_3PO_4$—$Li_2S$—$SiS_2$, etc.

The lithium salt is a material which is dissolved in the non-aqueous electrolyte well, and may use, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloro borane lithium, lower aliphatic carbonic acid lithium, 4 phenyl boric acid lithium, imide, etc.

Further, for the purpose of improving the charging/discharging characteristics, flame retardant, etc., the non-aqueous electrolyte may also be added with, for example, pyridine, triethylphosphite, triethanolamine, cyclic ether, ethylene diamine, n-glyme, hexa phosphoric acid tri amide, nitrobenzene derivative, sulfur, quinone imine dye, N-substituted oxazolidinone, N,N-substituted imidazolidine, ethylene glycol dialkyl ether, ammonium salt, pyrrole, 2-methoxy ethanol, trichloroaluminum, etc. In some cases, the non-aqueous electrolyte may further include halogen-containing solvents such as carbon tetrachloride, trifluoroethylene, etc., to impart nonflammability, further also include carbon dioxide gas to improve high-temperature preservation characteristics, and further include fluoro-ethylene carbonate (FEC), propene sultone (PRS), etc.

Such a lithium secondary battery according to the present invention, as described above, may be lithium-ion batteries, lithium polymer batteries, lithium metal batteries, and lithium free batteries.

Such a lithium secondary battery may be used as a power source of devices. The device may be, for example, laptop computers, netbooks, tablet PCs, mobile phones, MP3s, wearable electronic devices, power tools, electric vehicles (EVs), hybrid electric vehicles (HEVs), plug-in hybrid electric vehicles (PHEVs), E-bikes, E-scooters, electric golf carts, or power storage systems, but of course, is not limited thereto.

Hereinafter, the present invention will be described with reference to Examples, but these Examples are to more easily understand the present invention and the scope of the present invention is not limited thereto.

Preparation Example 1 (Organic Layer)

A polyvinylidenefloride-chlorotrifloethylene copolymer (PVdF-CTFE) polymer was added to acetone by about 5 wt % and then dissolved for about 12 hours at a temperature of 50° C. to prepare a polymer solution.

Preparation Example 2 (Organic-Inorganic Hybrid Layer: for Coating)

$BaTiO_3$ powder was added to the polymer solution in Preparation Example 1 to be a ratio of $BaTiO_3$/PVdF-CTFE=90/10 (wt % ratio) and crushed and pulverized by using a ball mill method for 12 hours or more to prepare an organic-inorganic hybrid composition. The particle diameter of $BaTiO_3$ may be controlled according to a size (particle size) of beads used in the ball mill method and an application time of the ball mill method, but in Preparation Example 2, the particle diameter of $BaTiO_3$ was pulverized at about 400 nm to prepare the organic-inorganic hybrid composition.

Preparation Example 3 (Organic-Inorganic Hybrid Film: for Insulation Film)

The organic-inorganic hybrid composition prepared in Preparation Example 2 was coated and dried on a PET release film in a thickness of 10 μm to prepare a laminate with the organic-inorganic hybrid film formed on the release film.

Preparation Example 4 (Preparation of SRS Separator)

A polyvinylidenefloride-chlorotrifloethylene copolymer (PVdF-CTFE) polymer was added to acetone by about 5 wt % and then dissolved for about 12 hours at a temperature of 50° C. to prepare a polymer solution. $BaTiO_3$ powder was added to the polymer solution to be a ratio of $BaTiO_3$/PVdF-CTFE=90/10 (wt % ratio) and crushed and pulverized by using a ball mill method for 12 hours or more to prepare a slurry. The particle diameter of $BaTiO_3$ in the slurry prepared above may be controlled according to a size (particle size) of beads used in the ball mill method and an application time of the ball mill method, but in Preparation Example 4, the particle diameter of $BaTiO_3$ was pulverized at about 400 nm to prepare the slurry. The slurry prepared above was coated on a polyethylene separator (porosity of 45%) of a thickness of about 18 μm by using a dip coating method, so that the coating thickness was adjusted to about 3.5 μm. The coated polyethylene separator was dried at 60° C. to form an active layer, and as a result of measuring the active layer using a porosimeter, the pore size and the porosity in the active layer coated on the polyethylene separator were 0.5 μm and 58%, respectively.

Example 1

A positive electrode mixture composed of 95 wt % of a positive electrode active material ($LiNi_{0.6}Co_{0.2}Mn_{0.2}O_2$), 2.5 wt % of Super-P (conductive material), and 2.5 wt % of PVDF (binder) was added in a solvent, NMP (N-methyl-2-pyrrolidone) to prepare a positive electrode slurry. Thereafter, the positive electrode slurry was coated (100 μm) on an aluminum current collector and one aluminum tab was welded on a non-coated portion of the current collector to prepare a positive electrode.

The negative electrode was prepared by roll-transferring a lithium metal of 40 μm on a copper current collector and welding one copper tab on a non-coated portion of the current collector.

The positive electrode was prepared so that a portion other than the tab had a size of 3.0×4.5 cm, and the negative electrode was prepared so that a portion other than the tab had a size of 3.1×4.6 cm. Then, the organic-inorganic hybrid film was transferred to the entire tab portion of the positive electrode from a side where the positive electrode and the negative electrode faced each other using the laminate of Preparation Example 3 to form an insulation film.

The transferring was performed by laminating the laminate on the tab portion of the positive electrode to face the organic-inorganic hybrid film and then rolling the laminate by a roller.

The SRS separator obtained in Preparation Example 4 was interposed between the positive electrode and the negative electrode to prepare a electrode assembly (bi-cell). The electrode assembly was put in a pouch-like case and connected with an electrode lead, and then injected with a dimethylcarbonate (DMC) solution dissolved with 4 M of a LiTFSI salt and sealed to assemble a lithium secondary battery.

Example 2

In Example 1, the positive electrode was prepared so that a portion other than the tab had a size of 3.1×4.6 cm, and the negative electrode was prepared so that a portion other than the tab had a size of 3.0×4.5 cm. Then, the organic-inorganic hybrid film was transferred to the entire tab portion of the negative electrode from a side where the positive electrode and the negative electrode faced each other using the laminate of Preparation Example 3 to form an insulation film.

Comparative Example 1

In Example 1, except that any insulation film was not formed on the negative electrode and the positive electrode, a lithium secondary battery was assembled in the same manner as Example 1.

Comparative Example 2

In Example 1, except that the organic-inorganic hybrid composition of Preparation Example 2 was coated on the entire tab portion of the positive electrode in a thickness of 10 μm without using the laminate of Preparation Example 3 and dried at 60° C. to form an insulation film, a lithium secondary battery was assembled in the same manner as Example 1.

Comparative Example 3

In Example 1, except that the polymer solution prepared in Preparation Example 1 was coated on the entire tab portion of the positive electrode in a thickness of 10 μm without using the laminate of Preparation Example 3 and dried at 60° C. to form an insulation film, a lithium secondary battery was assembled in the same manner as Example 1.

Comparative Example 4

In Example 1, except for attaching an insulating tape (made of PET, 3M, thickness: 30 μm) to the entire tab portion of the positive electrode without forming the insulation film on the negative electrode and the positive electrode, a lithium secondary battery was assembled in the same manner as Example 1.

Experimental Example 1 Experiment of Short-Circuit Occurrence Rate

In order to determine the safety of the lithium secondary batteries manufactured in Examples 1 to 2 and Comparative Examples 1 to 4, while conducting an evaluation of lifetime at room temperature (25° C.), a voltage drop phenomenon that appeared when a short circuit occurred before 200 cycles was confirmed.

The evaluation of lifetime was performed charge and discharge to 200 cycles to 1.0 C in a section of 2.5 V to 4.35 V.

The result was shown in the following Table 1.

TABLE 1

|  | Short-circuit occurrence rate (Short-circuit occurrence/evaluation number) |
| --- | --- |
| Example 1 | 0/50 |
| Example 2 | 0/50 |
| Comparative Example 1 | 2/50 |
| Comparative Example 2 | 0/50 |
| Comparative Example 3 | 0/50 |
| Comparative Example 4 | 0/50 |

Referring to Table 1, Comparative Example 2 in which an insulating layer was not formed at all, the short circuits occurred even before 200 cycles, while when forming an insulating layer, it can be confirmed that the short circuit does not occur.

Experimental Example 2 Experiment of Defect Rate 100 lithium secondary batteries prepared in Examples 1 to 2, and Comparative Examples 1 to 4 were prepared and charged and discharged three times to 0.1 C in a section of 2.5 V to 4.5 V, and the number of cells with a reduced measurement capacity from the first time to the third time was shown in Table 2 below.

TABLE 2

|  | Defect rate (The number of cells with reduced capacity/Evaluation number) |
| --- | --- |
| Example 1 | 0/100 |
| Example 2 | 0/100 |
| Comparative Example 1 | 0/100 |
| Comparative Example 2 | 5/100 |
| Comparative Example 3 | 3/100 |
| Comparative Example 4 | 2/100 |

Referring to Table 2, it can be seen that in the case of using the insulation film according to the present invention, the capacity reduction does not occur, while in the case of coating the organic layer, coating the organic/inorganic layer, and coating the insulating tape, the capacity is reduced.

In the case of coating the organic layer or the organic/inorganic layer, since a coating material is filled in pores on the electrode layer during coating, the insulating tape of Comparative Example 4 has no ion conductivity, and thus, the capacity is not expressed at a covered portion at all.

Experimental Example 3 Experiment for Improving Thermal Explosion by Endothermal Effect of Inorganic Material In order to confirm the improvement of safety of the lithium secondary batteries prepared in Examples 1 to 2 and Comparative Examples 1 to 4, a hotbox test on the prepared batteries was performed while increasing the temperature from 130° C. at a rate of 5° C./min for 1 hour, and then the results were shown in Table 3.

TABLE 3

|  | Explosion temperature (° C.) |
| --- | --- |
| Example 1 | 181 |
| Example 2 | 180 |
| Comparative Example 1 | 172 |
| Comparative Example 2 | 180 |
| Comparative Example 3 | 172 |
| Comparative Example 4 | 173 |

Referring to Table 3, it can be seen that in Comparative Examples 3 to 4 without containing inorganic particles and Comparative Example 1 without containing the insulating layer, the explosion temperature was relatively low.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

INDUSTRIAL APPLICABILITY

As described above, in the electrode assembly according to the present invention, the insulation film is formed on some or all of at least one side of the tab of the electrode to prevent short-circuits between the electrodes by internal/external short-circuits, local crush, etc. In addition, the insulation film is configured as the organic-inorganic hybrid film to have ion conductivity, thereby preventing the resistance from increasing even if the insulation film is partially formed on the electrode active material layer.

Furthermore, a separate insulation film rather than a coated form is formed to prevent deterioration of performance of the secondary battery such as increased resistance, reduced capacity, etc., which may be shown by impregnating the coating material into the pores on the surface of the electrode active material layer.

Further, the insulation film includes a specific organic material to delay the thermal explosion due to an endothermal effect of the inorganic material.

The invention claimed is:

1. An electrode assembly for a lithium secondary battery comprising:
    an electrode, a separator, and an opposing electrode,
    wherein the electrode comprises a structure in which an electrode active material layer is formed on an electrode current collector,
    wherein the electrode current collector comprises an electrode current collection substrate and a tab extending from the electrode current collection substrate,
    wherein an insulation film is formed on some or all of at least one surface of the tab extending from the electrode current collection substrate, and
    wherein the insulation film is an organic-inorganic hybrid film comprising inorganic particles and a binder polymer.

2. The electrode assembly of claim 1, wherein:
    the electrode and the opposing electrode face each other, and
    the insulation film is formed on the tab of the electrode in a direction facing the opposing electrode.

3. The electrode assembly of claim 1, wherein:
    the electrode and the opposing electrode face each other, and
    the insulation film is further formed on the tab of the opposing electrode in a direction facing the electrode.

4. The electrode assembly of claim 1, wherein:
    the insulation film is formed on the whole of both sides of the tab.

5. The electrode assembly of claim 1, wherein:
    the binder polymer is at least one selected from the group consisting of polyvinylidene fluorideco-hexafluoropropylene, polyvinylidene fluoride-cotrichloroethylene, polymethylmethacrylate, polyacrylonitrile, polyvinylpyrrolidone, polyvinylacetate, polyethylene-co-vinyl acetate, polyimide, polyethylene oxide, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, and polyvinylalcohol.

6. The electrode assembly of claim 1, wherein:
    the inorganic particles are at least one selected from the group consisting of (a) an inorganic particle having a dielectric constant of 1 or more, (b) an inorganic particle having piezoelectricity, (c) thermal conductive inorganic particles, and (d) an inorganic particle having a lithium-ion transfer capability.

7. The electrode assembly of claim 1, wherein:
    the content of the inorganic particles is 1 to 99 wt % per 100 wt % of the mixture of the inorganic particles and the binder polymer.

8. The electrode assembly of claim 1, wherein:
    the insulation film is formed in a thickness of 0.1 μm to 100 μm.

9. The electrode assembly of claim 1, wherein:
    the electrode is a positive electrode and the opposing electrode is a negative electrode.

10. The electrode assembly of claim 1, wherein:
    the electrode is a negative electrode and the opposing electrode is a positive electrode.

11. The electrode assembly of claim 1, wherein:
    the separator is a safety reinforced separator.

12. A method for manufacturing the electrode assembly according to claim 1, comprising the steps of:
    (a) preparing an electrode assembly comprising an electrode, a separator, and an opposing electrode, wherein an electrode active material layer is formed on an electrode current collector of the electrode, wherein the electrode current collector comprises an electrode current collection substrate and a tab extending from the electrode current collection substrate;
    (b) preparing a laminate by coating and drying an organic-inorganic hybrid composition including inorganic particles and a binder polymer on a release film, thereby laminating an organic-inorganic hybrid film on the release film;
    (c) forming an insulation film on some or all of at least one surface of the tab of the electrode by laminating the organic-inorganic hybrid film after removing the release film from the laminate or directly transferring the organic-inorganic hybrid film from the laminate; and
    (d) manufacturing the electrode assembly with a separator interposed between the electrode of which the insulation film is formed on at least one surface of the tab and the opposing electrode.

13. The manufacturing method of the electrode assembly of claim 12, wherein:
    the electrode and the opposing electrode face each other, and
    the insulation film is formed on the tab of the electrode facing the opposing electrode.

14. The manufacturing method of the electrode assembly of claim 13, wherein:
    the electrode and the opposing electrode face each other, and
    the insulation film is further formed on the tab of the opposing electrode facing the electrode.

15. A lithium secondary battery comprising:
    the electrode assembly according to claim 1, and
    an electrolyte.

* * * * *